Figure 1:
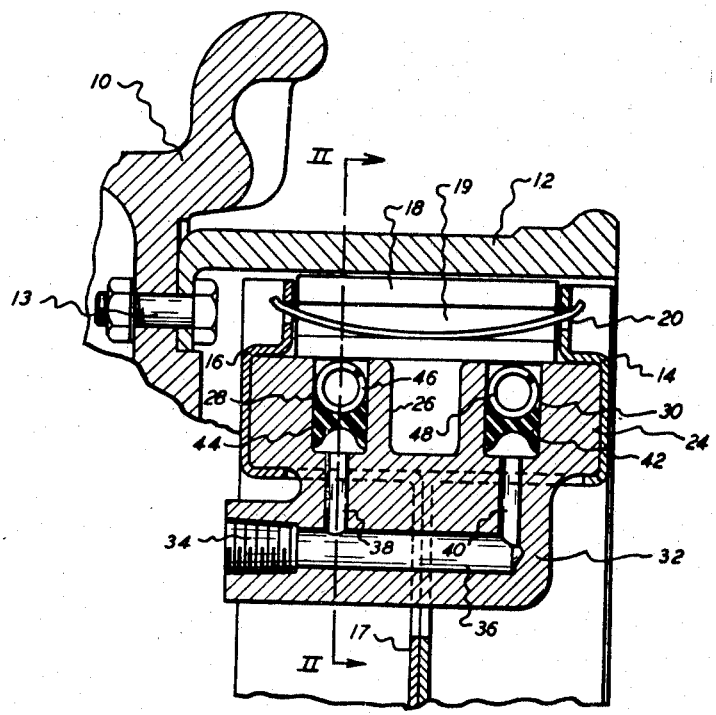

July 1, 1947.  C. HOLLERITH  2,423,315
BRAKE STRUCTURE
Filed March 16, 1944  3 Sheets-Sheet 1

Inventor
CHARLES HOLLERITH
By Beaman + Langford
Attorneys

July 1, 1947.　　　　C. HOLLERITH　　　　2,423,315
BRAKE STRUCTURE
Filed March 16, 1944　　　　3 Sheets-Sheet 3

Inventor
CHARLES HOLLERITH
By Beaman + Langford
Attorneys

Patented July 1, 1947

2,423,315

UNITED STATES PATENT OFFICE 2,423,315

BRAKE STRUCTURE

Charles Hollerith, Jackson, Mich., assignor, by mesne assignments, to The B. F. Goodrich Company, Akron, Ohio, a corporation of New York Application March 16, 1944, Serial No. 526,698

3 Claims. (Cl. 188—152)

The present invention relates to improvements in brakes having particular reference to high pressure hydraulic brakes of the type in which a radially expanding element acts upon a brake block or its equivalent to radially move the same into engagement with the brake drum.

As one of its objects the present invention contemplates an improved high pressure fluid actuated brake having a relatively narrow annular channel in which an annular piston-like member is radially expanded to exert a braking force upon the brake element.

Another object of the present invention provides an improved radially expansible piston-like assembly through which hydraulic pressure is directed against the braking element.

A still further object of the present invention is to provide a high pressure radial brake including as part of the actuating structure annular sealing rings acting in conjunction with a radial expansible piston-like element seated between the sealing means and the brake member.

These and other objects and advantages residing in the combination, construction and arrangement of parts will be more fully appreciated from a consideration of the following specification and annexed claims.

Figures 2, 3, 4:
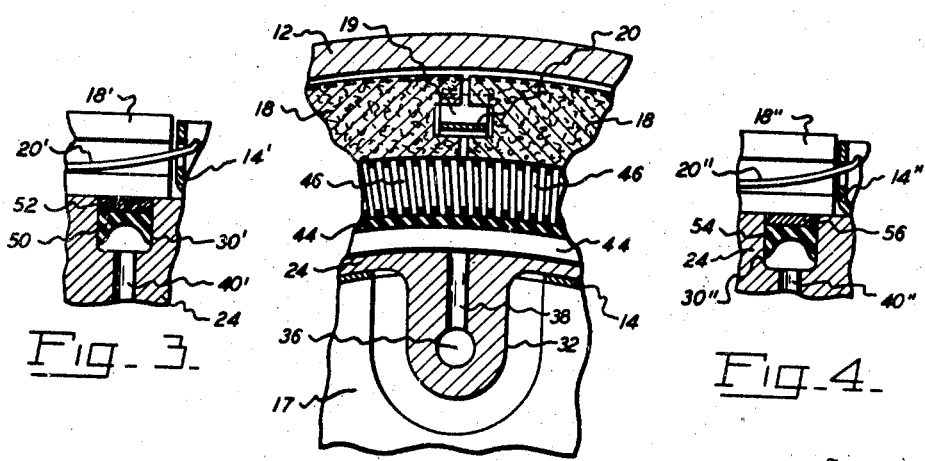
Figure 5:
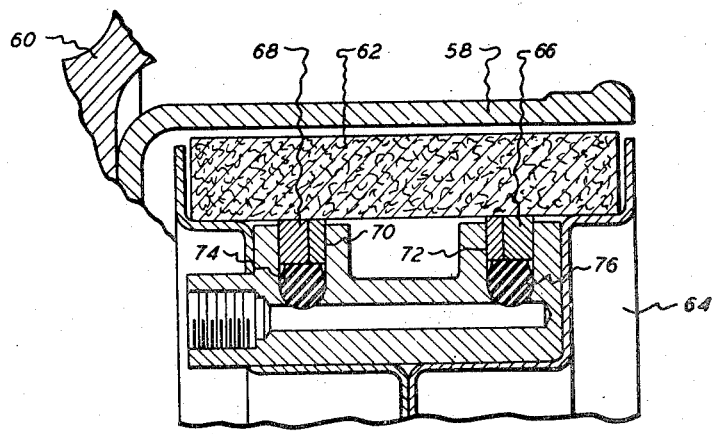
Figure 6:
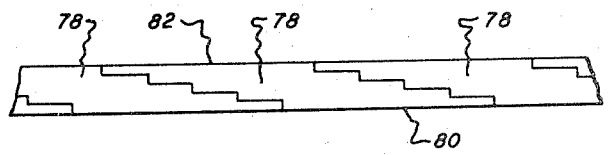
Figure 7:
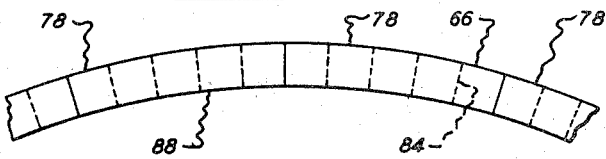
Figure 8:
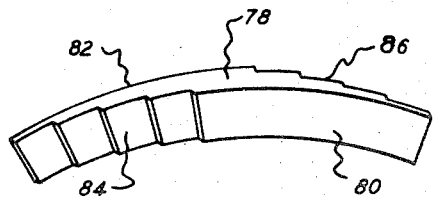
Figure 9:
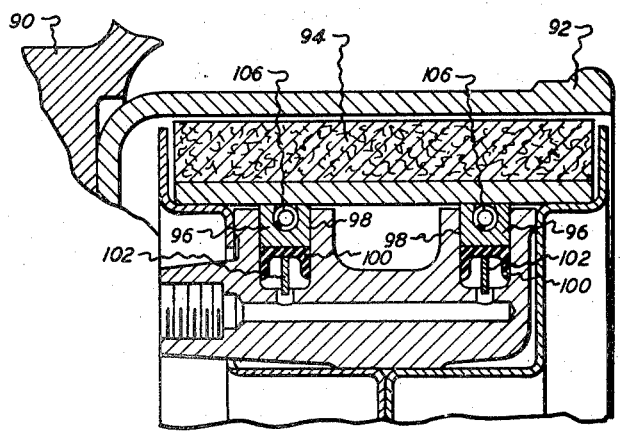
Figures 11, 12:
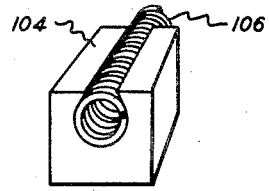
Figure 10:
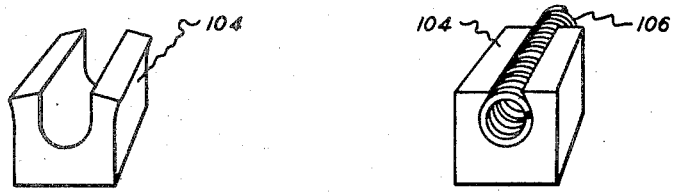
Figure 13:
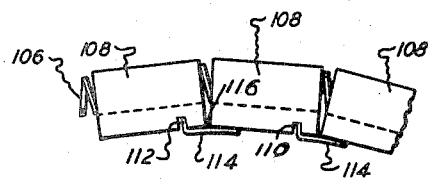

In the drawings, wherein several forms of the invention are illustrated,

Fig. 1 is a vertical cross-sectional view of a fragmentary portion of the wheel and brake assembly embodied in the present invention, Fig. 2 is a cross-sectional view through the brake structure taken on the line II—II of Fig. 1, Fig. 3 shows a modified form of thrust member disposed on the sealing ring of the brake block, Fig. 4 is a view similar to Fig. 3 of a further modified form of the thrust member against which the sealing ring acts, Fig. 5 is a view similar to Fig. 1 of a further form of the invention, Fig. 6 is a plan view of the thrust member of Fig. 5, Fig. 7 is a view in elevation of the thrust member shown in Fig. 6, Fig. 8 is a perspective view of the arcuate step elements shown in Figs. 5 to 7, inclusive, Fig. 9 is a view similar to Fig. 1 of a modification of the invention, Fig. 10 is a fragmentary side elevational view of the thrust member shown in Fig. 9, Fig. 11 is a perspective view of the thrust member shown in Fig. 10, as viewed from the plane XI—XI, Fig. 12 is a perspective view of an element of the thrust member prior to assembly, and Fig. 13 is a fragmentary elevational view of the thrust member having a shim for protecting the joint between adjacent arcuate members.

Referring to the drawings, the wheel 10 supports the brake drum 12 through suitable bolts 13. The brake structure comprises a sheet metal channel shape annular rim member 14, which may be provided with inset depressions 16 to take the thrust of the brake block 18 slotted at their ends as at 19 to receive assembly spring 20, all in the manner shown in my Patent No. 2,350,038, issued May 30, 1944. As shown, the channel shape ring 14 is made of two similar stampings having radially inwardly extending flanges which together collectively form the torque flange 17.

In lieu of the employment of a low pressure expander tube, as shown in my aforesaid patent, the annular cast ring 24 is provided having a central channel 26 to lighten the structure and channels 28 and 30 shown cast integral with the ring 24. One or more fluid connectors 32 having connections 34 communicating with the transverse passage 36 connect with the channels 28 and 30 through radial passages 38 and 40.

Located within the channels 28 and 30 are sealing rings 42 and 44, preferably of rubber, either natural or synthetic. It will be noted that the rings 42 and 44 are of a construction which function to seal fluid pressure within the channels 28 and 30, and permit circulation of fluid circumferentially within the channels 28 and 30 and are capable under the influence of fluid pressure to be radially expanded within the channels 28 and 30.

While there are conditions wherein it would be possible for the sealing rings 42 and 44 to directly engage with the underside of the brake block 18, it is preferred to employ some suitable form of thrust member between the sealing rings 42 and 44 and the brake block 18. In the form of the invention illustrated in Figs. 1 and 2, the thrust member takes the form of a closely wound helical spring 46, which is more clearly shown in Fig. 2, and is wound from square wire stock so as to present a more uniform surface to the sealing rings. The thrust element in the form of the coil 46 has the advantage of being radially expansible and contractable, and then wound and supported in the channels 28 and 30 in the manner shown will support the sealing rings 42 and 44 and transmit the fluid pressure to the brake block 18.

In the modification shown in Fig. 3, the sealing ring 50 supported in the channel 30' is restrained and acts through the associated members 52, constituted as separate ring members or as an expansible helical coil. In Fig. 4 an arrangement similar to that shown in Fig. 3 is provided through a thrust member 56 in the form of a split ring interposed between the sealing ring 54 and the brake block 18".

In the modifications shown in Figs. 5 to 8 inclusive, the brake drum 58 is supported from the wheel 60. The brake blocks 62, supported in the channel shape ring 64, are urged radially outward against the brake drum 58 through thrust elements 66 and 68 operating in channels 70 and 72, against which fluid pressure is exerted through the sealing rings 74 and 76. As more clearly shown in Figs. 6 to 8 inclusive, thrust elements 66 and 68 are formed from a plurality of arcuate members 78 having parallel sides 80 and 82 and complementary stepped portions 84 and 86 which register with adjacent end portions of adjacent elements and represent a substantially continuous and uniform under surface 88 to the sealing rings 74 and 76. It will be understood that upon radial expansion of the sealing rings 74 and 76 that there will be a slight circumferential separation of the individual elements 74. As this separation will be uniformly distributed throughout the circumference, the increase in spacing between the adjacent ends of the elements 78 will be exceedingly small.

A further modification of the present invention is illustrated in Figs. 9 to 12 inclusive, wherein the wheel 90 supports the brake drum 92 against which the brake blocks 94 are urged by thrust rings 96 operating in channels 98 and radially expanded by hydraulic pressure acting against the sealing rings 100. As shown, stop rings 102 hold the rings 100 away from the bottom of the channel 98 so as to permit hydraulic pressure to freely circulate circumferentially of the channel 98 and to be readily discharged from the channel 98 upon brake release.

The radially expansible thrust member 96 is illustrated in Figs. 10 to 12 inclusive, and is made up from a series of channel segments 104, which may be formed as shown in Fig. 12 and then closed upon a closely wound helical spring 106, as shown in Fig. 11.

In Fig. 13 is shown one manner in which further protection of the sealing ring may be provided. As shown, the thrust elements 108 are notched at 110 to receive the turned up end 112 of the shims 114, which underlap the joint 116 between adjacent elements 108.

Having thus described my invention what I desire to secure by Letters Patent and claim is:

1. A radial brake assembly comprising a main peripheral portion, a radially expansible and contractable brake element supported in said peripheral portion, means defining a narrow radial wall channel opening radially outward and being directly adjacent to and bridged by said brake element, an annular sealing means supported in said channel and adapted to be radially displaced therein, means for directing fluid pressure into said channel against said sealing means to radially displace the same in said channel, thrust means disposed between said sealing means and said brake element, said thrust means including resilient radially expansible and contractable structure disposed in said channel and acting upon said sealing means to contract the same in said channel upon brake release.

2. A radial brake assembly comprising a main peripheral portion, a radially expansible and contractable brake element supported in said peripheral portion, means defining a narrow radial wall channel opening radially outward and being directly adjacent to and bridged by said brake element, an endless annular sealing means supported in said channel and adapted to be radially displaced therein, means for directing fluid pressure into said channel against said sealing means to radially displace the same in said channel, said sealing means being of inverted U-section with the leg portions thereof forming a fluid pressure chamber with the walls of said channel, said leg portion being spread by fluid pressure to seal with the radial walls of said channel and to counteract the tendency of the sealing means to reduce in cross-sectional area upon the radial expansion of the sealing means in said channel.

3. A radial brake assembly comprising a main peripheral portion, a radially expansible and contractable brake element supported in said peripheral portion, means defining a narrow radial wall channel opening radially outward and being directly adjacent to and bridged by said brake element, an annular sealing means supported in said channel and adapted to be radially displaced therein, means for directing fluid pressure into said channel against said sealing means to radially displace the same in said channel, said sealing means being of inverted U-section with the leg portions thereof forming a fluid pressure chamber with the walls of said channel, said leg portion being spread by fluid pressure to seal with the radial walls of said channel and to counteract the tendency of the sealing means to reduce the cross-sectional area upon the radial expansion of the sealing means in said channel, and thrust means disposed between said sealing means and said brake element, said thrust means including resilient radially expansible and contractable structure disposed in said channel and acting upon said sealing means to contract the same upon brake release.

CHARLES HOLLERITH.

REFERENCES CITED

The following references are of record in the file of this patent:

UNITED STATES PATENTS

| Number | Name | Date |
|---|---|---|
| 2,187,226 | Davis | Jan. 16, 1940 |
| 2,239,236 | Lambert | Apr. 22, 1941 |
| 2,240,218 | Lambert | Apr. 29, 1941 |
| 2,390,311 | Kupiec et al. | Dec. 4, 1945 |

Certificate of Correction

Patent No. 2,423,315.  July 1, 1947.

CHARLES HOLLERITH

It is hereby certified that error appears in the printed specification of the above numbered patent requiring correction as follows: Column 2, line 51, for the word "then" read *when*; and that the said Letters Patent should be read with this correction therein that the same may conform to the record of the case in the Patent Office.

Signed and sealed this 2nd day of September, A. D. 1947.

[SEAL]

LESLIE FRAZER,
*First Assistant Commissioner of Patents.*